US006667971B1

(12) United States Patent
Modarressi et al.

(10) Patent No.: US 6,667,971 B1
(45) Date of Patent: Dec. 23, 2003

(54) SYSTEM AND METHOD FOR ENHANCED ADSL ARCHITECTURE AND SERVICE CONCEPTS

(75) Inventors: Abdi R. Modarressi, Lawrenceville, GA (US); Henry J. Fowler, Jr., Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/454,917

(22) Filed: Dec. 6, 1999

(51) Int. Cl.$^7$ ............................................. H04L 12/66
(52) U.S. Cl. ...................... 370/352; 370/401; 370/409
(58) Field of Search ................................ 370/352, 356, 370/395.31, 395.52, 395.53, 399, 401, 409

(56) References Cited

U.S. PATENT DOCUMENTS

| 6,141,339 | A | * | 10/2000 | Kaplan et al. | ......... 370/395.61 |
| 6,430,185 | B1 | * | 8/2002 | Kerns et al. | ............. 370/395.1 |
| 6,493,348 | B1 | * | 12/2002 | Gelman et al. | ............. 370/401 |

OTHER PUBLICATIONS

ADSL Forum 98–107, "Core Network Architectures for ADSL Access Systems," Mar. 1998.

K.R. Frank, et al., "Fast Access ADSL Architecture Description," TM–ATSEC–01–98–084.

Andrew S. Tanenbaum, *Computer Networks*, Pretence Hall (3rd ed. 1996).

* cited by examiner

*Primary Examiner*—Chau Nguyen
*Assistant Examiner*—Nittaya Juntima
(74) *Attorney, Agent, or Firm*—Shaw Pittman LLP (57) ABSTRACT

A system and method to provide enhanced computer network services to computer network subscribers. A static route is created in the subscriber's computer to establish a continuous logical connection between the subscriber's computer and a continuous service provider to provide the subscriber with continuous services. Simultaneously, subscribers can obtain services offered by temporary service providers over the network. To obtain these services, the system establishes a temporary logical connection between the user and the temporary service provider. The temporary logical connection is destroyed when the user has completed using the desired services of the temporary service provider. To increase security, the continuous service provider is not directly connected to systems not controlled by the continuous service provider, such as the Internet. However, where such security concerns are not relevant, the continuous service provider can be connected to such systems.

28 Claims, 7 Drawing Sheets

SYSTEM AND METHOD FOR ENHANCED ADSL ARCHITECTURE AND SERVICE CONCEPTS

BACKGROUND

1. Field of Invention

The present invention relates generally to a system and method for providing computer network services. More specifically, the present invention relates to improving the variety of services offered to users of high speed data access systems, such as asymmetric digital subscriber line (ADSL) systems, and increasing the security involved with providing those services.

2. Background of the Invention

Asymmetric digital subscriber line (ADSL) technology offers significantly higher data rates than conventional modems. With a typical upstream (i.e., from a subscriber) data rate of 256 kilobits per second (Kbps), and a typical downstream (i.e., to the subscriber) data rate of 1.5 megabits per second (Mbps), service providers are able to offer services not possible or practical using traditional modems. These services can provide subscribers with new and more efficient ways of obtaining information and conducting business. It should be noted that even higher data rates than those mentioned above can be achieved with ADSL.

Figure 1:
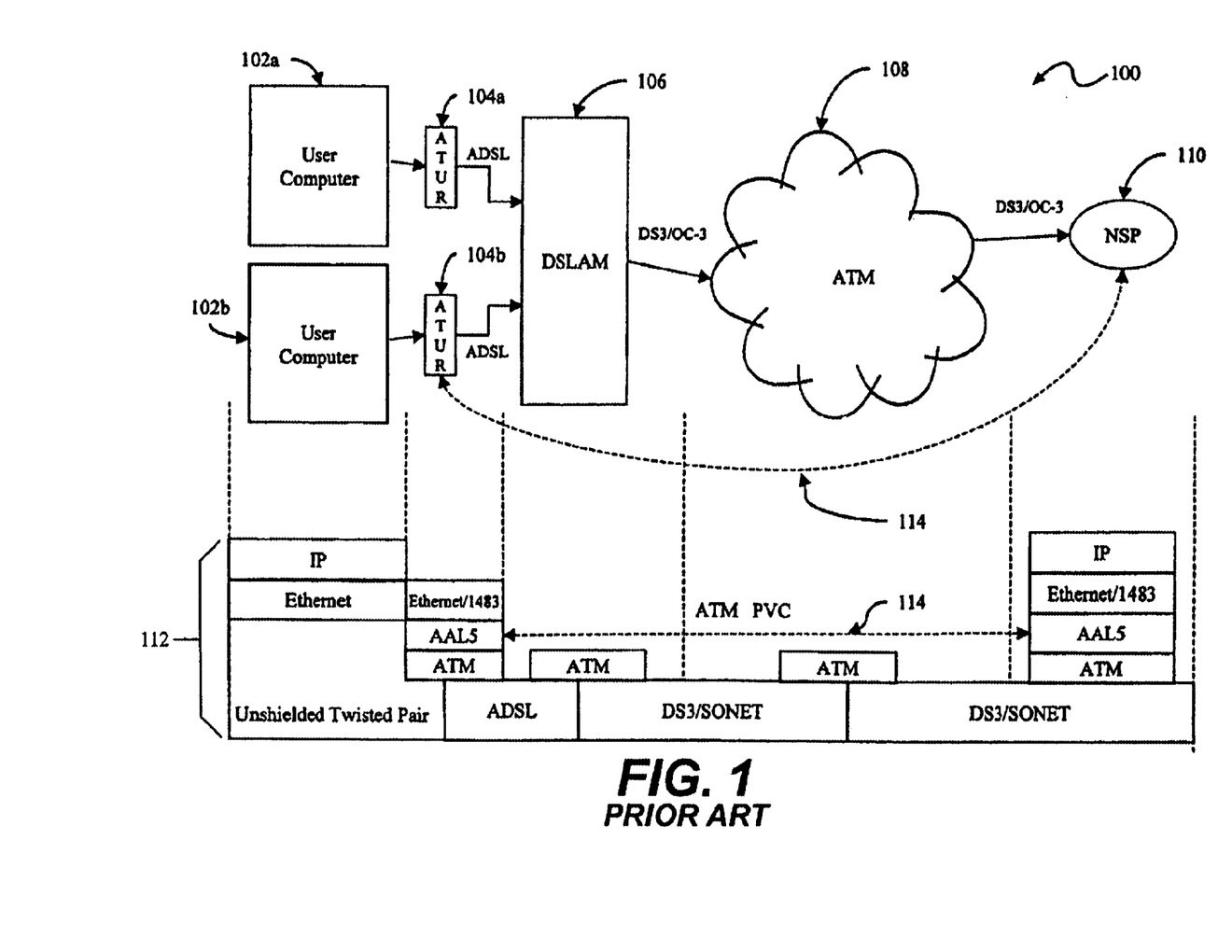
FIG. 1 illustrates schematically a prior art system for communicating using ADSL technology.

A prior art system 100 using ADSL transport is shown in FIG. 1 in which a user employs Ethernet access locally. Referring to FIG. 1, users using computers 102a and 102b communicate with a network service provider (NSP) 110 using the increased bandwidth offered by ADSL. Computers 102a and 102b communicate through internal or external ADSL termination unit-remotes (ATU-Rs) 104a and 104b respectively. ATU-Rs 104a and 104b convert data from computers 102a and 102b respectively into ATM format and forward the data to a digital subscriber line access multiplexer (DSLAM) 106 using ADSL transport. A single DSLAM, for example, the A1000 DSLAM offered by Alcatel, can terminate 576 loops. Other DSLAMs can terminate different numbers of loops, depending on the apparatus and technology used.

DSLAM 106 terminates the ADSL transport signal, and forwards the data (in ATM format) to a network, e.g., ATM network 108, using DS3 or OC-3 signal transports. DS3 and OC-3 are well-known signal formats for transporting data through ATM network 108. The data is forwarded to NSP 110 by (or through) ATM network 108. Conventionally, ATM network 108 is a wide-area network using fiber optic data communication links. Communication with NSP 110 is done using ATM formatting over SONET, DS3, or DS1 transport.

As illustrated by the protocol stack 112 in FIG. 1, data from user computer 102a is transmitted to ATU-R 104a in Internet Protocol (IP) format using an Ethernet local network. That data is formatted by ATU-R 104a into ATM format for transmission to NSP 110. Data is transmitted from ATU-R 104a to DSLAM 106 using ATM cells. DSLAM 106 switches the ATM cells and directs them to the ATM network 108. On the receiving side, the data is forwarded to NSP 110 using ATM cells over DS1, DS3 or OC-3 links. When the ATM cells reach NSP 110, they are reassembled to form Internet Protocol (IP) packets and distributed to the appropriate server via IP. As illustrated in FIG. 1, a permanent virtual circuit (PVC) 114 is established between user computer 102a and NSP 110 to direct the ATM cells appropriately. As shown in FIG. 1, ATM cells are sent on the PVC established between user computer 102a and NSP 110 (and from NSP 110 to user computer 102a) using the AAL5 protocol.

The term "permanent virtual circuit" (PVC) is ATM terminology for a virtual (logical) connection that has a well-defined origin, a well-defined destination, and a unique identification. A virtual connection converts a physical address corresponding to a physical origin and a physical destination of the connection to a unique connection identification representative of the physical path from the origin to the destination of the connection. ATM cells are injected into a PVC at its origin, and transported over the PVC to the destination. Thus, a PVC is an example of a logical connection from a physical origin to a physical destination of the connection. The actual physical route over which the ATM cells travel can be complex. Using the term PVC reduces the complexity to a virtual concept, which is easier to conceptualize and discuss. ATM and other communication systems are described in more detail in Andrew S. Tanenbaum, *Computer Networks*, Prentice-Hall ($3^{rd}$ Ed. 1996), which is incorporated by reference herein in its entirety.

System 100 is an example of a conventional single PVC system. Conventional single PVC systems suffer from at least one serious drawback. Such systems use a dedicated PVC between the user and the NSP. However, other NSPs can be attached to ATM network 108. For example, Internet Service Providers (ISPs), corporate networks and campus networks can be attached. Because the PVC is dedicated to a specific NSP, it is difficult for a subscriber to choose between different NSPs. To do so, the subscriber must call the ADSL service provider, e.g., a telephone company or NSP, and have the PVC dedicated to a different NSP. This is time consuming, costly and inconvenient for the subscriber, the telephone company and the service provider.

Thus, the conventional architecture severely limits the subscriber's choice of NSPs as well as the subscriber's choice of the services the NSPs provide. Users desiring services only offered by one NSP, as well as other services offered by another NSP, are not able to get both sets of services using system 100 unless the NSPs have a tunneling agreement (described below) in place. Moreover, because NSPs must offer virtually all services that a particular subscriber desires, they are less able to offer specialized services more tailored to specific subscriber's needs, and for which they may have particular expertise.

One solution to this problem has been the use of tunneling arrangements. Through tunneling arrangements, NSPs reach agreements so that a user of one NSP's services can have access to another NSP's services through the first NSP. This solution is not optimal for a number of reasons. For example, the freedom that users have to choose a particular NSP is limited to those having tunneling arrangements in place. In addition, the burden on the first NSP's system, when there are many users trying to tunnel to other NSPs, can degrade the performance of the first NSP's system.

Figure 2:
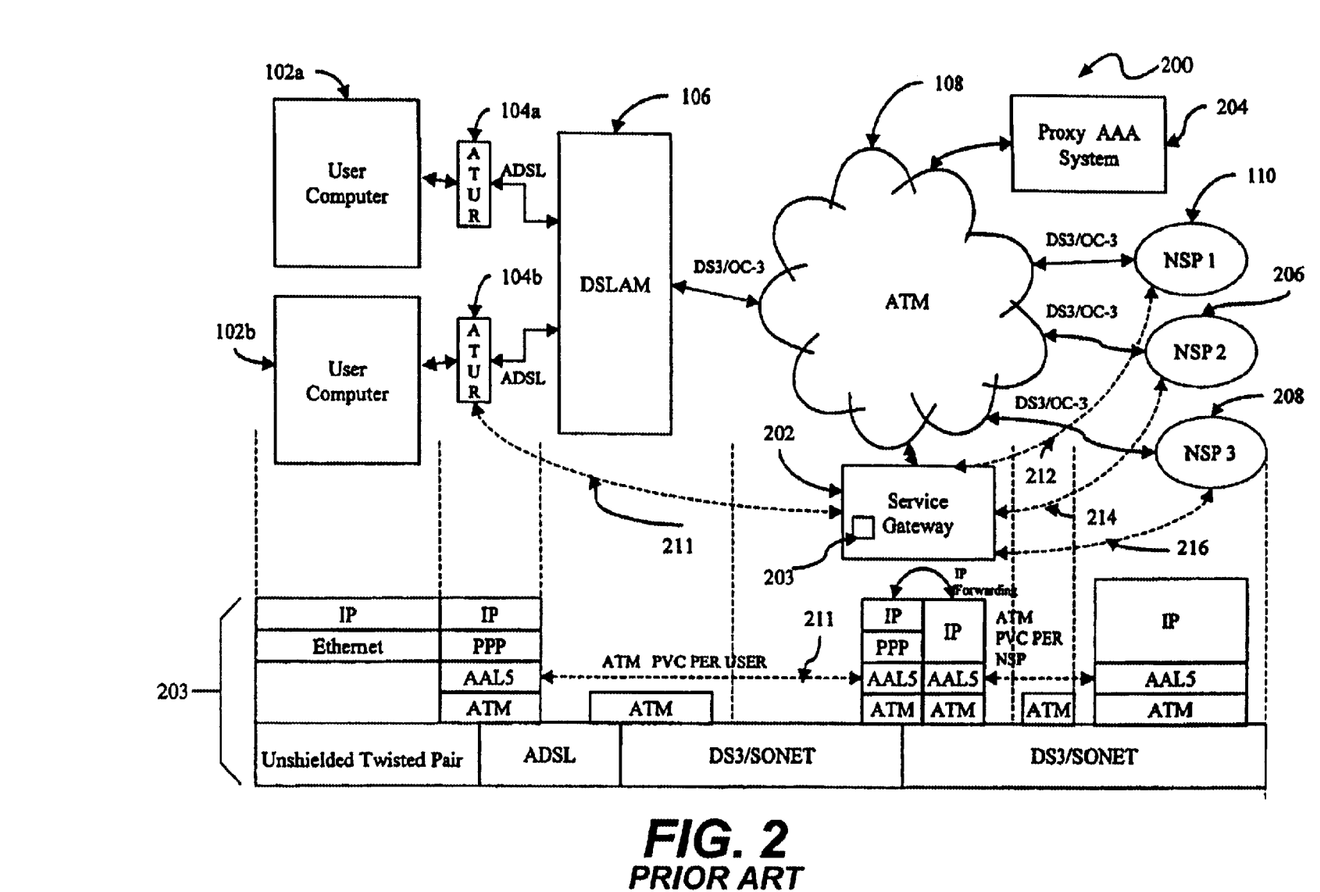
FIG. 2 illustrates schematically a prior art system for communicating using ADSL technology having a conventionally configured service gateway.

A more robust solution to the problem is to add a service gateway 202 as shown in system 200 in FIG. 2. Referring to FIG. 2, system 200 has essentially the same structure as that of system 100 with the addition of service gateway 202 and optional proxy AAA system 204. Service gateway 202 and proxy AAA system 204 allow users to select any of the NSPs, for example, NSP 110, NSP 206 or NSP 208 to obtain computer network services.

Service gateway 202 performs a second desirable function. It aggregates all the users desiring to communicate with a particular NSP onto a single PVC pipe. The single pipe carries all the data to or from the NSP. This is important because many ATM devices (including ATM switches and NSP routers) do not have sufficient ports to support large numbers of ATM PVCs. This aggregation decreases the complexity on the NSPs' routers, lessens the burden on personnel and systems responsible for configuring, maintaining and monitoring the ATM connections, and allows NSPs to request the type of ATM pipe, or pipes, that best meet their need to balance cost and quality of service (QoS). The details of provisioning and session management for this architecture are described in K. R. Frank, et al., "Fast Access ADSL Architecture Description," TM-ATSEC-01-98-084, which is incorporated by reference herein in its entirety.

The protocol stacks described above with respect to system 100 are also used in system 200, except that some changes are made at service gateway 202 to accept and evaluate the address (i.e., which NSP) to which to route the session. Further, service gateway 202 performs IP forwarding to send the message to the correct NSP as chosen by the user. Thus, service gateway 202 puts the data into the correct pipe so that it is sent to the correct NSP.

Specifically, to implement system 200, a new protocol layer is added between service gateway 202 and ATU-R 104*a* and 104*b*. An example additional layer is the Point-to-Point Protocol (PPP) as illustrated in FIG. 2. The PPP protocol provides a mechanism for the user's computer to deliver the address of the desired NSP to service gateway 202 so that service gateway 202 can complete the routing to that NSP. The following description is of the PPP-Terminated Architecture (PTA) described in ADSL Forum Document 98-017, which is hereby incorporated by reference in its entirety. The L2TP Access Architecture (LAA) can also be supported by service gateway 202, but is not discussed in detail here. LAA is described in more detail in ADSL Forum Document 98-017.

As illustrated in FIG. 2, a PVC 211 is established between computer 102*b* and service gateway 202. Routing information (e.g., the name of the desired NSP) is transmitted to service gateway 202 from user computer 102*b*. Service gateway 202 uses the routing information to establish a session with the desired NSP over the PVC between service gateway 202 and the desired NSP. Such PVCs include PVC 212, PVC 214 and PVC 216, which are logical connections with NSPs 110, 206 and 208 respectively. Note that PVCs 212, 214 and 216 are used to carry all communication intended for the corresponding NSP. These sessions are established using well-known communication protocols. See, for example, protocol stack 203 shown in FIG. 2.

To perform the dynamic user-NSP relationships allowed by the addition of service gateway 202, information must be set up in service gateway 202. For example, it must contain addresses for the NSPs to establish communication sessions with the NSPs. Service gateway 202 routes traffic to the selected NSP. All data to or from each specific NSP goes through a single pipe (the PVC connection) established for that NSP.

To verify a user's authorization to use the services offered by a particular NSP, a proxy AAA system 204 is added to system 200. Proxy AAA system 204 is preferably another computer which communicates with NSPs to relay authentication and authorization information to NSPs.

Conventionally, service gateway 202 collects authentication and authorization information, and the desired NSP, from the user's computer 102*b* in the original PPP message. Service gateway 202 passes this information on to proxy AAA system 204. Proxy AAA system 204 then relays that information to the appropriate NSP, using a protocol such as the well-known RADIUS protocol. When the NSP verifies that the user is authentic, proxy AAA system 204 sends a message to service gateway 202 instructing it to add the user's data to the pipe carrying that NSP's data. Further details of this authentication process can be found by referring to the PPP Terminated Architecture (PTA) architecture described in ADSL Forum 98-017, "Core network Architectures for ADSL Access Systems," March 1998, which is incorporated by reference herein in its entirety. Note that the service gateway can relay authorization and authentication information via direct connection with the NSP without the proxy AAA server, i.e., the proxy AAA server is not used.

One method for a user to select a particular NSP is by providing its name in the original PPP information. For example, a user may supply the address message USER@NSPxxx.com. This message instructs the service gateway to establish communication between the user and NSPxxx's network NSPxxx.com. Service gateway 202 converts the address to a proper network address using a routing table. Such routing tables are well-known to those skilled in the art. They contain entries corresponding to various destinations with which service gateway 202 communicates. Each entry contains among other things, a subnet address, a mask, and an IP address.

Service gateway 202 is conventionally configured so that a subscriber can choose a particular service provider without having to incur the expense and delay of contacting the phone company or NSP. Thus, the addition of the service gateway provides the subscriber the freedom to choose service providers in a dynamic way. For example, a subscriber may wish to get email or voicemail messages from a first service provider 110. Subsequently, the subscriber may wish to surf the Internet using another service provider 206. Using the service gateway, the subscriber can choose service provider 110 or 206, as desired. The service gateway manages disconnecting connections and establishing connections to effectuate the subscribers' desires without having to contact the phone company or NSP to reroute established ADSL connections. However, the user cannot communicate with the first and subsequent service providers simultaneously in this prior art approach, because the user has only one PVC.

However, subscribers often would like to have the services of a particular provider available at any time, without having to select that provider and go through the process of logging in each time a service is desired. For example, a subscriber may desire that his email, fax and voicemail provider always be available so that the subscriber is notified of email, fax and voicemail when it arrives. That subscriber may also desire the freedom to select another service provider for other services that subscriber may want, without disconnecting from the initial service provider, for example, access to the Internet.

GLOSSARY

The following acronyms are used herein and are intended to have their conventional industry meanings:

AAA—Authentication, Authorization and Accounting

AAL5—ATM Adaptation Layer 5

ADSL—Asymmetric Digital Subscriber Line

ATM—Asynchronous Transfer Mode

ATU-R—ADSL Termination unit-Remote

DSn—Digital Signal n (e.g., DS3 corresponds to Digital Signal 3)
DSLAM—Digital Subscriber Line Access Multiplexer
GUI—Graphical User Interface
IP—Internet Protocol
ISP—Internet Service Provider
LAN—Local Area Network
NSP—Network Service Provider
OC-n—Optical Circuit n (e.g., OC-3 corresponds to Optical Circuit 3)
PPP—Point-to Point Protocol
PTA—PPP-Terminated Architecture
PVC—Permanent Virtual Circuit
QoS—Quality of Service
SONET—Synchronous Optical Network
SVC—Switched Virtual Circuit
WAN—Wide Area Network

SUMMARY OF THE INVENTION

The present invention is a system and method for allowing a user to maintain a continuous logical connection to at least one continuous service provider, while having the option to connect simultaneously to at least one temporary service provider as desired. The continuous service provider provides services to which a user may desire to have continuous access, such as email, voicemail, facsimile (fax), community news, telephone calls and any other continuous services the user wants on a continuous basis. The temporary service provider provides services that the user may want from time to time. For example, the user may want temporary access to the Internet.

In the preferred embodiment of the present invention, a continuous logical connection is established with a particular service provider chosen by the user. This service provider is the user's continuous service provider. The continuous logical connection allows the user to obtain the services of the chosen service provider continuously.

In the preferred embodiment, the continuous logical connection includes a logical connection between the user and a service gateway, and between the service gateway and the continuous service provider. Data is sent to the service gateway, which aggregates all the data destined for the continuous service provider onto a single pipe or stream over which the data is transmitted to and from the service provider. This aggregation of data is part of the IP forwarding function performed by the service gateway. The continuous logical connection remains active for as long as the user's computer is in operation, i.e., powered up, the ATU-R is active and the line remains connected.

When the user chooses to use a temporary service provider, a temporary logical connection is established between the user and the temporary service provider. The end-to-end temporary logical connection between the user and the service provider is taken down once the user logs off the chosen temporary service provider.

In a preferred embodiment of the present invention, the continuous service provider manages and controls all of the equipment necessary to provide the continuous services to the user, including the service gateway, proxy AAA system (if used) and ATM network, to thereby preserve the integrity of the system. In this preferred embodiment, the continuous service provider does not offer traditional real-time Internet access services. As a result, the present invention can increase the security of the system over that of conventional systems, where outside connectivity is often required.

The present invention also allows service providers to specialize the services they provide. For example, some service providers have expertise in providing the services that users want on a continuous basis, while others are better equipped to offer services that users want from time-to-time. Using the present invention, service providers can choose to develop services that users want continuously, services that users want from time to time, or combinations of these services. The specialization among service providers that is enabled by the present invention is likely to lead to a wider variety, of better and more cost effective services to the user.

Accordingly, one object of the present invention is to provide subscribers with continuous access to at least one service provider while simultaneously allowing the subscriber to access the services of other service providers as desired.

Another object of the present invention is to facilitate the addition of "vertical features" into the basic transport service.

Another object of the present invention is to increase the kinds of services currently available to subscribers of high speed data access service providers.

Another object of the present invention is to provide alternative choices for subscribers to efficiently and cost effectively obtain the services they desire.

Another object of the present invention is to provide a continuous secure way for users to get various services, while simultaneously accessing non-secure entities such as the Internet.

These and other objects of the present invention are described in greater detail in the detailed description of the invention, the appended drawings and the attached claims.

DETAILED DESCRIPTION OF THE PREFERRED EMBODIMENTS

Figure 3:
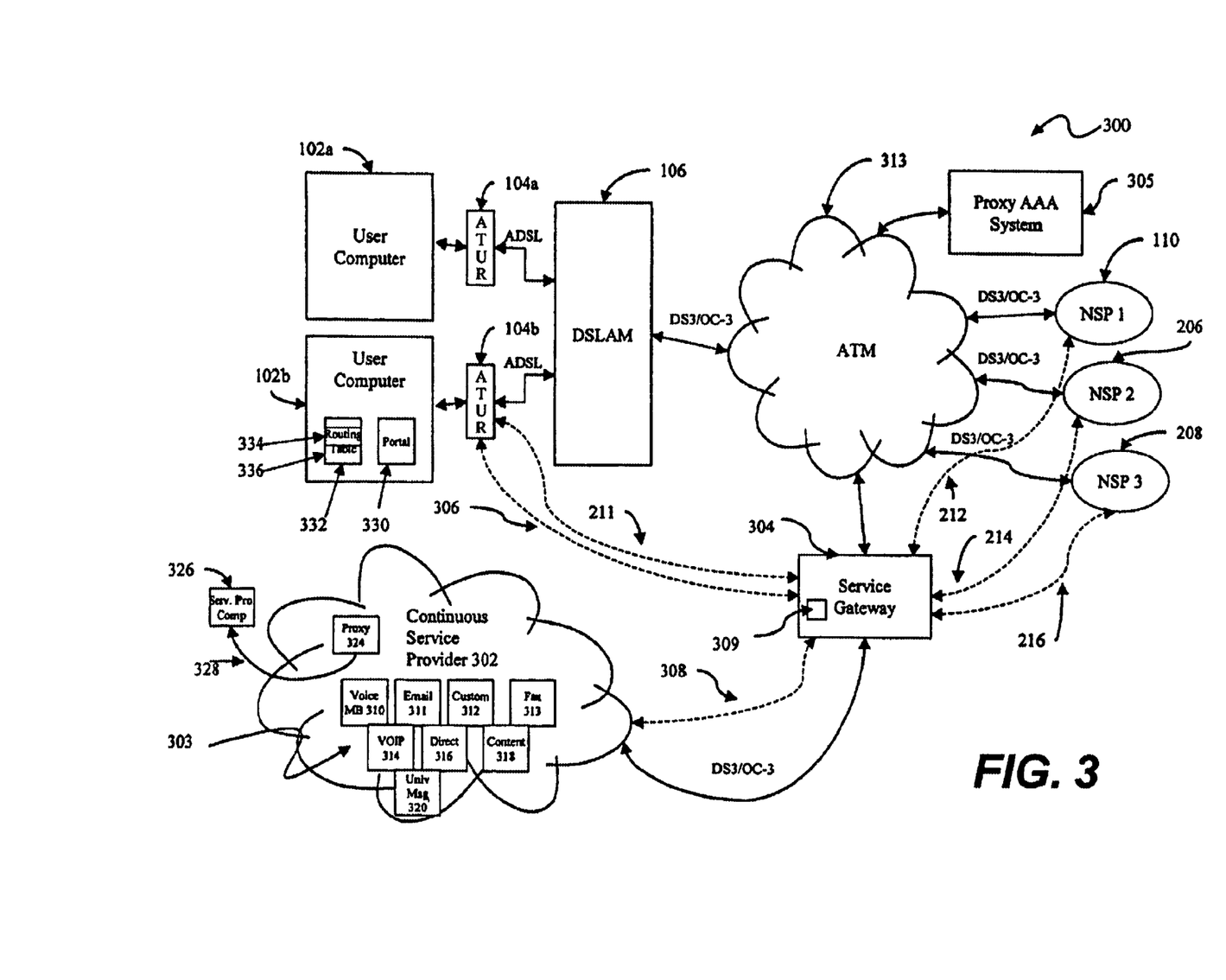
FIG. 3 illustrates schematically a system for communicating using ADSL technology according to a preferred embodiment of the present invention.

FIG. 3 illustrates schematically a system 300 according to a preferred embodiment of the present invention. Referring to FIG. 3, users (or subscribers) using computers 102a and 102b communicate with several NSPs: NSP 110, NSP 206 and NSP 208. The NSPs can be Internet service providers (ISPs), corporate networks, LANs, WANs, campus networks, or any other network providing services that the user may desire. To the user, these NSPs are temporary service providers, in the sense that the user may desire to use their services from time-to-time.

In addition, the user using computer 102b desires to communicate with a continuous service provider 302 to obtain services continuously, while simultaneously having the ability to access NSP 110, NSP 206 or NSP 208 from time to time. The ability to simultaneously use the services of a continuous service provider and a temporary service provider is accomplished using a static route (described below) set up in a routing table 332 of the user computer 102b. The static route establishes a continuous logical connection between user computer 102b and continuous service provider 302.

In the preferred embodiment of the present invention, ATU-R 104b is a network card, manufactured by Efficient Networks located in Dallas, Texas, having model number 3060. This card has the ability to support and provide control for multiple logical connections. In the preferred embodiment of the present invention, service gateway 304 is manufactured by Alcatel located in Raleigh, N.C., having model number DANA 1131.

In a preferred embodiment of the present invention in which ATM transport is used, the continuous logical connection consists of two continuous logical connections known as permanent virtual circuits (PVC) as shown in FIG. 2. PVC 306 is established between computer 102b and service. gateway 304, and PVC 308 is established between service gateway 304 and continuous service provider 302. Alternatively, PVC 308 can represent a logical association between service gateway 304 and continuous service provider 302 realized within a connectionless IP network. The protocols for establishing the required continuous logical connections are the same in system 300 as the protocols shown in system 200, but have not been expressly shown in FIG. 3 for the sake of clarity. The continuous logical connection allows the user to get those services the user desires continuously, including, for example, email and voicemail with or without incoming message or call notification, community notices, telephone calling capabilities, fax and any other services the user may desire on a continuous basis.

The continuous logical connection further provides additional security when it is inside a "protective sphere" of the continuous service provider. For example, in the preferred embodiment, continuous service provider 302 controls the ATM network 313, service gateway 304 and server cluster 303. Security is further increased in an alternative preferred embodiment, where continuous service provider 302 does not offer direct connectivity to the Internet. In this alternative embodiment, server cluster 303 is a cluster of servers not directly connected to the Internet, thereby providing a separate source of services for the user. Because there is no direct conventional connectivity to the largely uncontrolled Internet, the risk of malicious hackers, viruses or other undesired access to other NSPs that a user may be connected to while connected to continuous service provider 302 is reduced. Corporate NSPs are especially sensitive to such security considerations.

Continuous service provider 302 is also termed a "point of injection," because it is the point at which services are injected into the system. Services are "injected" by adding another server to server cluster 303 or adding additional capability to an existing server in server cluster 303. Because these services are added at the same conceptual level in the system architecture, they are known as "vertical services" or "vertical features." Thus, the present invention greatly facilitates a service provider's ability to add new vertical features through the point of injection to those services already offered. As a result, the present invention is readily scalable.

Figure 3A:
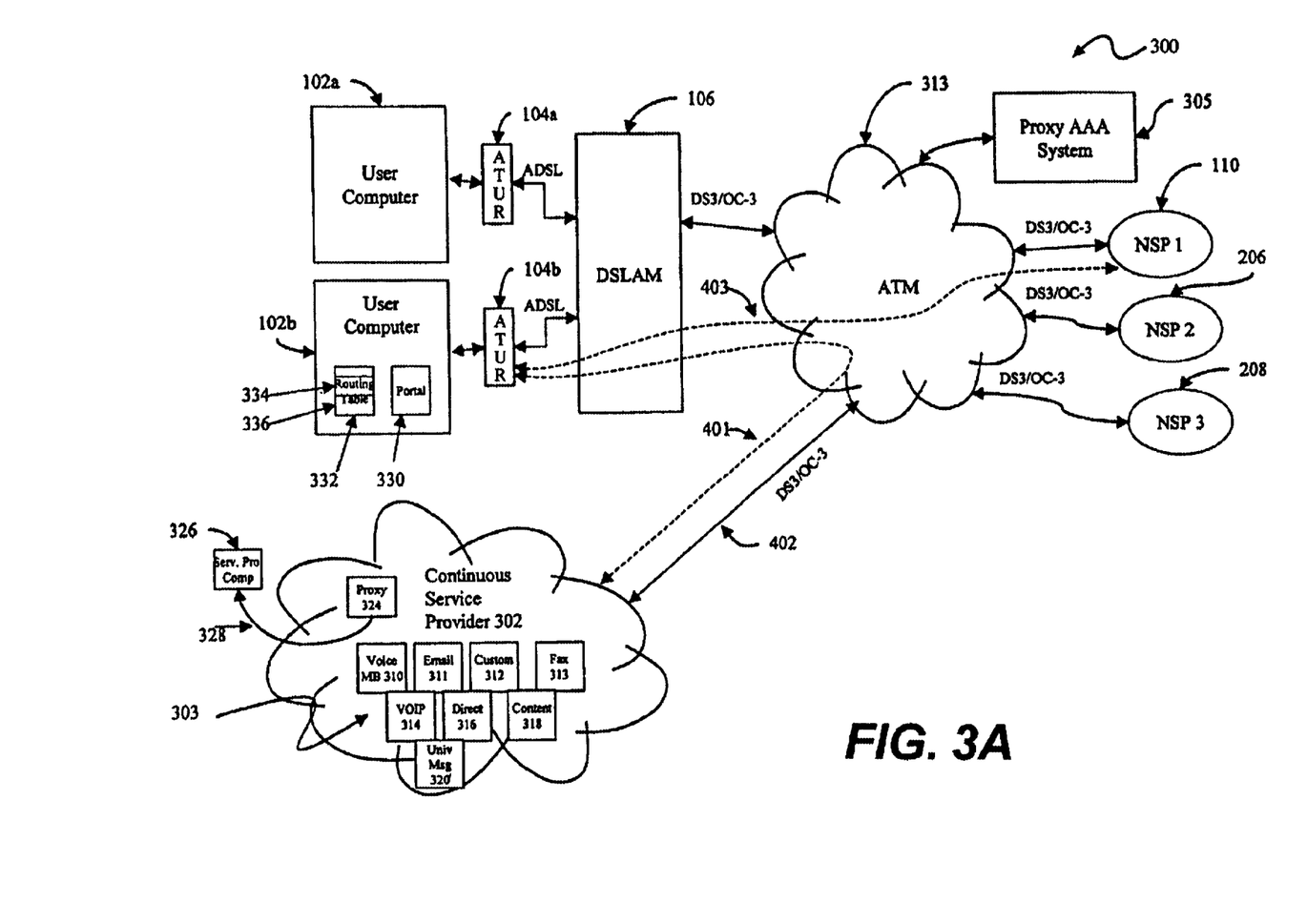
FIG. 3A illustrates schematically a system for communicating using ADSL technology according to a preferred embodiment of the present invention using switched virtual circuits.

In an alternative preferred embodiment of the present invention, the continuous and temporary logical connections are established from the user computer 102b to the NSPs and/or continuous service providers using any combination of switched virtual circuits (SVCs) and PVCs. Switched virtual circuits are well-known in the art and can replace service gateway 304 in the alternate preferred embodiment. FIG. 3A is a schematic illustration of a preferred embodiment of the present invention in which user 102b connects to continuous service provider 302 using SVC 401. In this embodiment, continuous service provider 302 supports an SVC capable interface 402 to ATM network 313. In additions, SVCs can be set up to NSPs on demand, for example SVC 403.

Preferably, the user interface is a browser window or other client applications having a number of links that the user can select to perform the tasks offered by continuous service provider 302. For example, there can be links to access the customer service features, the voice-over-IP features, voice mailbox services and any other services offered by continuous service provider 302. Such interfaces are wellknown to those skilled in the art.

In the preferred embodiment, the user accesses the services offered by continuous service provider 302 by clicking buttons or icons corresponding to those services which are displayed on the user's graphical user interface (GUI). The GUI is set up by a software process 330 called a communications portal executing on the user's computer.

Communications portal 330 also displays buttons/icons for the other NSPs to which the user can connect through temporary logical connections. Each user can have a personalized set of NSPs to access. The communications portal software can be developed by continuous service provider 302 or third party developers. The user can choose to use any of the other NSPs, for example NSP 110, NSP 206 or NSP 208 by clicking on a button/icon associated with the particular NSP displayed on the GUI. Service gateway 304 uses a routing table 309 much in the same way as. described above for service gateway 202 and routing table 203. The point-and-click selection device of the present invention to select the continuous service provider services and NSPs preserves the familiar selection paradigm of virtually all current windows-based computer systems.

When a user logs onto continuous service provider 302, continuous service provider 302 authenticates the user. This authentication preferably has two parts. In a preferred embodiment, a high-level authentication task is performed by an application in the server cluster 303. However, before this high-level authentication, a low-level authentication can be done.

Optionally, the authentication is automatic; that is, the user does not need to respond to queries from continuous service provider 302. Alternatively, the user interacts with continuous service provider 302 to provide responses (e.g., user identification number and/or password) required for authentication. The user's username and password can be authenticated by the continuous service provider's AAA server 305.

In either event, a PPP session can be set-up between the user and the service gateway. As part of the set-up process, service gateway 304 passes the following to user computer 102b: the IP address of the user's device, the IP address to get to the service gateway, and the mask of the IP subnetwork that includes both IP addresses. All addresses are stored in a routing table 332 in user computer 102b.

Application-level authentication can then be performed. Continuous service provider 302 authenticates the user if the information is correct.

In routing, the "default gateway" is the address to which packets are sent if other routes in the routing table do not indicate a specific destination. In conventional systems, the default gateway changes to the gateway of the last network to which a PPP session has been initiated. Thus, if a user attempted to connect to a continuous service provider, the continuous service provider would initiate a session to an NSP. The NSP's gateway address becomes the default gateway address, and data destined for the server cluster 303 would then be routed to the NSP, where it would be discarded. The present invention overcomes this problem in conventional systems.

The ability for the user's computer to simultaneously communicate with the NSP and the continuous service provider is configured by communications portal 330. Communications portal 330 must combine the continuous service provider's gateway IP address information with the subnetwork address of the server cluster 303 to create a static route in routing table 332, so the user's device will always route packets destined for the server cluster 303 over the PVC with an active PPP session to the continuous service provider. Static route 336 directs server traffic to cluster of servers 303 within the continuous service provider 302's network. Traffic to the NSP uses the IP address assigned by the NSP.

In a preferred embodiment, when a user powers up computer 102b, the communications portal 330 executes automatically. Upon executing, communications portal 330 establishes contact with the continuous service provider, authorizes and authenticates the user, and obtains the user's IP address. The communications portal also sets up the GUI described above.

Communications portal 330 establishes contact with continuous service provider 302 by setting up a logical connection with continuous service provider 302. To set up the logical connection, user computer 102b must obtain an IP address from continuous service provider 302. To obtain the IP address, the communications portal establishes a PPP session with service gateway 304 through which computer 102b forwards the identity of continuous service provider 302 and user authorization and authentication information. In a preferred embodiment of the present invention, the identity of the continuous service provider is sent as the domain name that the communications portal uses to make the connection. For example, to connect to continuous service provider 302, the communications portal sends the message "USERID@CSP302," where "CSP302" is the domain name corresponding to continuous service provider 302. The message also contains authorization and authentication information. In the preferred embodiment of the present invention this authorization and authentication information includes the identification of the user, for example, "USERID," and a password associated with that user.

Using this information, service gateway 304 contacts continuous service provider 302. Once service gateway 304 has established contact with continuous service provider 302, service gateway 304 sends the authorization and authentication information to continuous service provider 302. As described above, proxy AAA server 305 can facilitate the authorization and authentication task. Continuous service provider 302 uses the authorization and authentication information to verify that the user is authorized to access services provided by continuous service provider 302. The authentication process is well-known to those skilled in the art. Upon successful authentication, service gateway 304 transmits continuous service provider 302's IP address to communications portal 330 executing on user computer 102b.

Communications portal 330 receives the IP address and uses it to create a static route. The static route is an entry in the routingtable of computer 102b that represents the route by which to send data to various points. The route is static because it remains for as long as the communications portal is active. If the communications portal is terminated, the static route entry preferably is deleted from the computer's routing table.

Figure 3B:
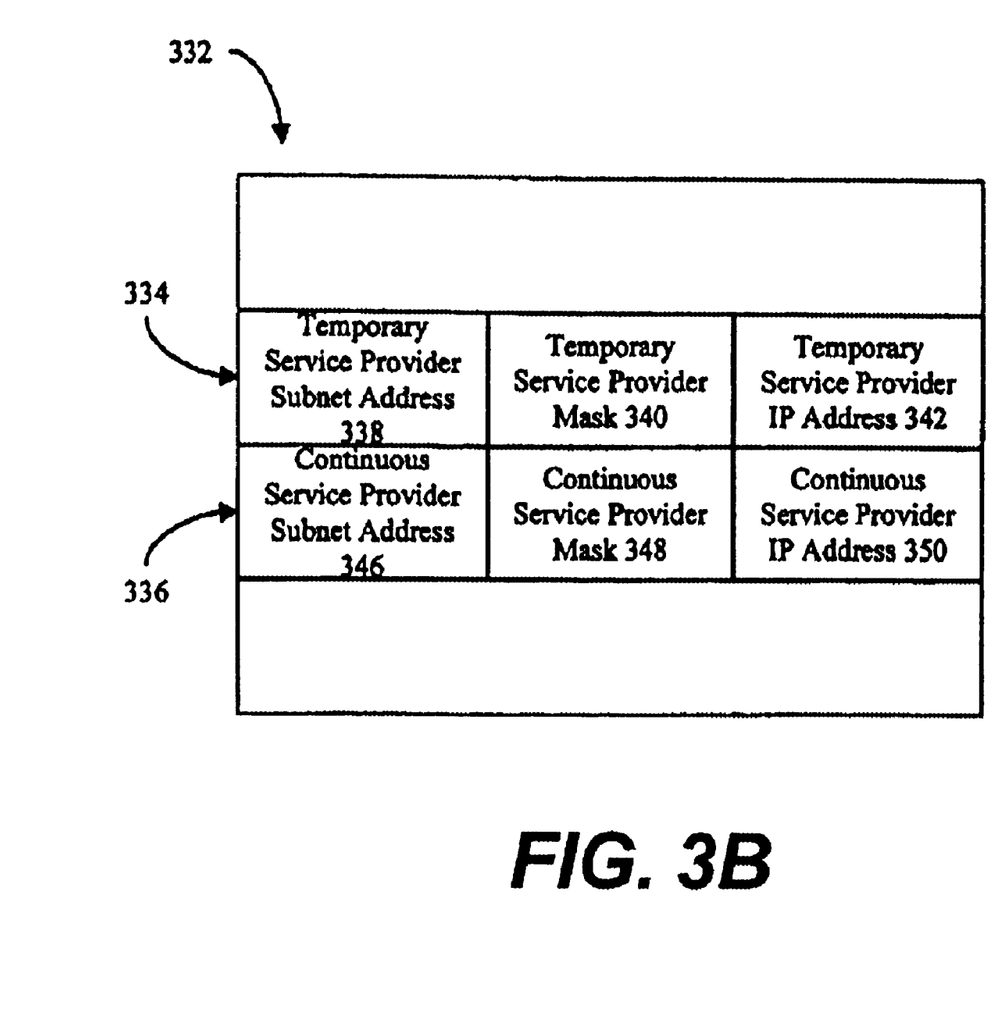
FIG. 3B is an exemplary routing table in a PC according to a preferred embodiment of the present invention.

Referring to FIG. 3B, an exemplary routing table 332 which can be used in the present invention is described. Routing table 332 contains two entries 334 and 336. Entry 336 corresponds to a static route for a continuous service provider, and entry 334 corresponds to a dynamic entry for a temporary service provider. Thus, once set up, entry 336 does not change for as long as communications portal 330 is active. Temporary service provider entry 334, on the other hand, is modified, e.g., each time a new temporary service provider is selected.

Subnet address 338 corresponds to the current temporary service provider. Subnet address 346 corresponds to continuous service provider 302. An exemplary subnet address is 90.90.90.0. IP address mask 340 corresponds to the current temporary service provider. IP address mask 348 corresponds to continuous service provider 302. An example, IP address mask is 255.255.255.0.

The IP address is the unique address that is sent by continuous service provider 302 for the user's computer. The Gateway IP address is the destination address provided in all data destined for the continuous service provider. IP address 342 corresponds to the address supplied by the current temporary service provider. IP address 350 corresponds to the address supplied by continuous service provider 302. An exemplary IP address is 90.90.90.3.

The present invention can be configured to allow a user to choose from multiple continuous service providers. In a first embodiment of the present invention where multiple continuous service providers are available, communications portal 330 sets up and deletes the static route entry (described above) corresponding to the particular continuous service provider that the user chooses. There is only one static route at any particular time. This static route corresponds to the particular continuous service provider with which the user is communicating.

In a second preferred embodiment of the present invention, where multiple continuous service providers are available, multiple instances of the communications portal are started for each continuous service provider that the user selects. Each instance of the communications portal works as described above, but communicates with a different continuous service provider. The second multiple continuous service provider embodiment allows for simultaneous connection to multiple continuous service providers.

In the preferred embodiment, continuous service provider 302 is a special network for ADSL or other high-speed access users that can provide virtually any service that those users may require on a continuous basis. Preferably, continuous service provider 302 does not provide a direct traditional connection to the Internet, which is the domain of ISPs, nor does it provide a connection to corporate LANs, which are the province of individual companies. Rather it is a resource that provides ADSL users with a variety of services which are always available to the user for as long as the user's computer is powered up. This prevents the user from having to log into the system each time the user requires certain services. However, in a less secure embodiment of the present invention, such connectivity to less secure entities, such as the Internet, is permitted so that continuous service provider 302 can offer services such as those offered by ISPs.

In a preferred embodiment, server cluster 303 includes a voice mailbox server 310 to provide voice mailbox services to the user on a continuous basis. The voice mail services include recording and playing back messages, forwarding messages, responding to messages, archiving messages and other voice mailbox services. To obtain these services, the user preferably clicks on a voice mailbox icon on the user's computer interface displayed by the communications portal. This causes a message to be sent over the continuous logical connection to the voice mailbox server 310. In response to the message, voice mailbox server 310 begins a voice mailbox session with the user. In the preferred embodiment, this occurs in a voice mailbox control window created by the communications portal on computer 102b's display screen. The user uses the displayed interface to perform the desired voice mailbox options. The voice mailbox operations are performed using well-known techniques. Data is transmitted between voice mailbox server 310 and computer 102b over the permanent logical connection using the communication protocols described above.

In a preferred embodiment, server cluster 303 includes a facsimile (fax) server 313 to provide fax services to the user on a continuous basis. The facsimile services include creating, storing and distributing messages and phone number management and other fax services. To obtain these services, the user preferably clicks on a fax icon on the user's computer interface displayed by the communications portal. This causes a message to be sent over the continuous logical connection to the fax server 313. In response to the message, fax server 313 begins a fax session with the user. In the preferred embodiment, this occurs in a window created by the communications portal on computer 102b's display screen. The user uses the displayed interface to perform the desired fax options. The fax operations are performed using well-known techniques. Data is transmitted between fax mailbox server 313 and computer 102b over the continuous logical connection using the communication protocols described above.

In a preferred embodiment, server cluster 303 includes an email server 311 to provide email services to the user on a continuous basis. The email services include creating, forwarding, replying to, storing, archiving messages and other email services. To obtain these services, the user preferably clicks on an email icon on the user's computer interface displayed by the communications portal. This causes a message to be sent over the continuous logical connection to the email server 311. In response to the message, email server 311 begins an email session with the user. In the preferred embodiment, this occurs in a window created by the communications portal on computer 102b's display screen. The user uses the displayed interface to perform the desired email options. The email operations are performed using well-known techniques. Data is transmitted between email server 311 and computer 102b over the continuous logical connection using the communication protocols described above.

Another server is a customer service manager 312. The customer service manager provides customer account management services to customers of continuous service provider 302. For example, customer account management services can include paying bills, ordering additional services, changing services, inquiring into the status of an account or any number of other customer services. For example, in a preferred embodiment, continuous service provider 302 is a telephone company. In that embodiment, the customer service manager provides the customer with a convenient way to pay bills, order new lines, order call forwarding, activate caller ID, review account status, review the user's current suite of services, and obtain any other services that the customer can order from the user's telephone company. To use these services, the user clicks on a customer service button in the GUI displayed by the communications portal. This begins a customer account management service session, preferably in a window-based format with which the user interacts to obtain the desired customer services. Data is transferred along the permanent logical connection between computer 102b and continuous service provider 302 using the protocols described above.

Another server in server cluster 303 is a voice-over-IP server 314. Voice-over-IP server 314 allows users to make telephone calls from their computers. Telephone calls can be made to other users of the system, or over the regular PSTN telephone network. To make a call to another user of the system, that other user (an IP call) must be connected to continuous service provider 302. For example, a user using computer 102b can place a voice-over-IP call to a user using computer 102a if computer 102a has a logical connection to continuous service provider 302. These are end-to-end IP calls. The voice is digitized in a well-known manner and transmitted as IP data packets. When the IP data packets reach their destination, they are converted back to analog voice using a digital-to-analog converter. The IP data packets are transmitted between computers 102a and 102b using the protocols discussed above. The transmission is full duplex, and given ADSL data rates, provide for excellent speech transmission quality, which can far surpass the quality of voice over the Internet today using conventional analog modems.

To make a call over the PSTN, voice-over-IP server 314 makes the appropriate connections to the PSTN. That is, voice-over-IP server 314 provides the interface for the user so that the user can make the call over the PSTN. When such a call is made, the called party receives the call in a conventional manner, even though the call originated on a computer, rather than a conventional telephone. Voice-over-IP server 314 acts as a gateway between the data network represented by the preferred embodiment and the PSTN. The gateway functions include required signaling interworking as well as conversion of voice from digital to analog; and vice versa.

Another server in server cluster 303 is a directory server 316. When a user logs in, the user's name can be listed on a list made accessible to other users by directory server 316. Other users can check the list to determine which users are currently logged onto the system. If a user sees another user on the list the user desires to contact, the user can choose that user by, for example, clicking (using a mouse or other pointing device) on the user's name. Many variations for displaying this list of users and allowing other users to select a user from the list of users for real time contact are possible. For example, the directory server can be proactive in that it displays to users the list of other users logged in. In addition, users select those users they wish to see and those users who are permitted to see when they are logged into the system. The continuous logical connection of the present invention facilitates this directory service feature because the user is always present, and available to be contacted, even when the user is using the services of other NSPs. In a preferred embodiment, directory server 316 is an AIN service control point (SCP) equipped with. lightweight directory access protocol (LDAP). The LDAP protocol is described in Andrew S. Tanenbaum, *Computer Networks*, Prentice-Hall ($3^{rd}$ Ed. 1996), which was heretofore incorporate by reference herein in its entirety.

The other user does not have to be logged onto the continuous service provider to communicate with the listed user. In a preferred embodiment, the directory server makes the directory listing available to any NSP connected to the service gateway. Using the directory listing, the other NSP informs its users of all the users logged onto the continuous service provider. Once again, users can select those users they wish to allow to see their name in the listing and those they do not. Significantly, the service gateway knows the user's IP address and can make the appropriate connection even though the user is using the continuous service provider's services, and not those of the NSP to which the other user is connected.

The communications portal can be used to alert the user of another user's attempt to make contact. This alert could be in many forms, including a pop up window or by causing the communications portal window to blink. In response, the user can, for example, answer the message, ignore the message, or send a busy response to the other user.

In a preferred embodiment, a service may alert a user that a telephone call is coming in, while the user is connected to the Internet. The user has the option of being connected to the incoming call without disconnecting from the internet, or forwarding the call to a voice mailbox, such as provided by voice mailbox server 310. In a preferred embodiment, when a regular phone in the house rings, the user is shown on the communications portal, or by pop up window who the caller is. The service also allows a record to be kept of who is calling. This provides a call screening functionality while simultaneously using the Internet.

In the preferred embodiment, all the services are provided in a very secure environment because all of the servers are owned and managed by the continuous service provider. When the services are all owned by continuous service provider 302, service provider 302 can perform well-known capacity management techniques to assure users a certain QoS.

These other services could include a community server. The community server can include a bulletin board, where events, homeowner association news, county meetings or other community information (i.e., information of more local interest) can be posted. The community server can include connectivity to other community servers, for example, schools so that parents can check on their children's progress in between more formal parent teacher meetings. Although preferably the community server is owned and managed by the continuous service provider, this is not necessarily the case. However, where security is a primary consideration, there should not be servers attached to the system that are not owned and controlled by the continuous service provider. The advantage is that this is part of the services provided by the continuous service provider and the user does not have to log onto other NSPs to obtain the same information.

Another server is a content server 318. The content server essentially provides connectivity to other servers which may be of interest to the user. For example, the content server may provide a hook to a video outlet so that users can have movies streaming down to their computers from the video outlet's server. Another content server is a music store or warehouse so that users can have music streaming down to their computers from the music store's owner. Another content server is a software house so that users can execute software remotely and have output displayed locally. It would be apparent to those skilled in the art that there are numerous kinds of content servers that would fall within the scope and spirit of the present invention.

Another server is a unified messaging server 320. Unified messaging server 320 takes any format message and converts it into any other format. For example, a caller might leave a voice mail message for the user on voice mail server 310. That message could be extracted by unified messaging server 320 and converted to an email message stored on email server 311. Email server 311 notifies the user at computer 102*b*, for example, of the pending email message.

Another server is a proxy server 324 which acts as a proxy to a service provider computer 326. Proxy server 324 is within the protective sphere of continuous service provider 302. Service provider computer 326 can be, but need not be, located within the protective sphere of the continuous service provider 302. Moreover, service provider computer 326 can be owned and operated by a service provider other than continuous service provider 302. To access the services of service provider 326's computer, the user signals proxy server 324 over the continuous logical connection to act as a proxy computer to set up a logical connection 328 with service provider computer 326. Service provider computer 326 then provides services to the user over logical connection 328 and the continuous logical connection formed by logical connections 306 and 308.

The present invention can also be used when a user has several computers or other IP devices networked together using a home network based on Ethernet. This creates an inherent problem for the PPP protocol, in that it cannot (as currently implemented) specify which computer in the network receives the data. Two solutions to this problem are to extend the PPP protocol to specify the particular computer to which the data should be sent, or to use the PPP protocol in tandem with a "tunneling" protocol to provide the required functionality. Currently, several such protocols for interfacing a single ADSL line with multiple computer platforms connected to a network have been proposed. These include PPP over Ethernet, and Layer 2 Tunneling Protocol (L2TP) and other tunneling protocols.

Figure 4:
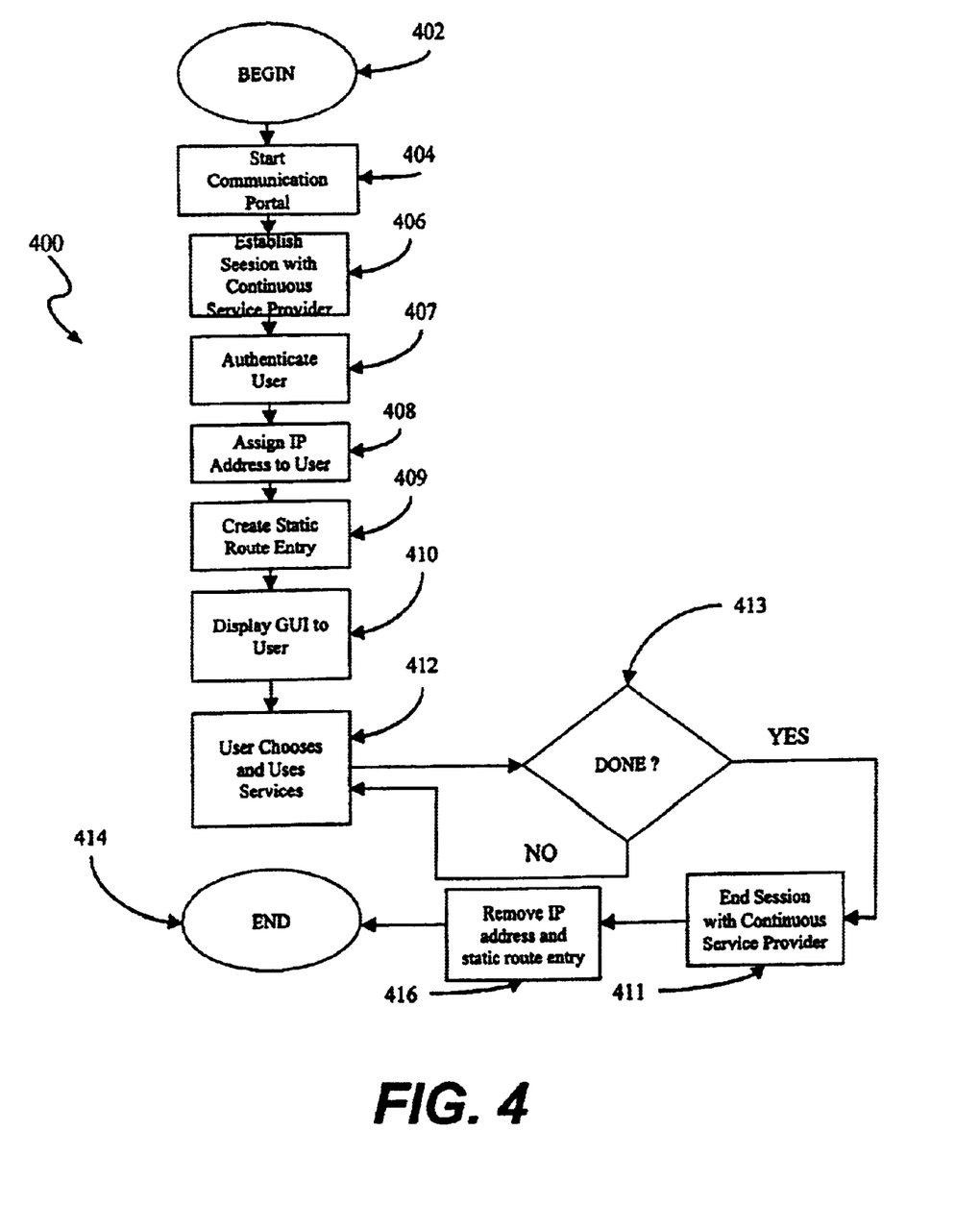
FIG. 4 is a flowchart for carrying out a method for providing enhanced computer network services according to a preferred embodiment of the present invention.

A method for providing enhanced services to ADSL users is described in flowchart 400 of FIG. 4. In the preferred embodiment, the system for implementing the method is the system described above with respect to FIG. 3. Referring to FIG. 4, the method begins in step 402, when a user powers up a user computer, for example user computer 102*b*, or the user clicks on a continuous service provider's button/icon on the desktop. In step 404, the user computer begins execution of the communications portal, for example, communications portal 330. Preferably, in step 406 the communications portal first establishes a PPP session with a continuous service provider, such as continuous service provider 302, to obtain authorization for the user to use the services of the continuous service provider.

Using the IP address returned by the continuous service provider, the communications portal creates a static route in the routing table. In the preferred embodiment, the continuous service provider assigns the user computer an IP address to which it will direct any communications in step 408. The communications portal sets up the graphical user interface in step 410. The GUI can be set up prior to step 410 as well. Steps 404–410 are preferably automatic in that the user does not have to enter any information to execute the steps. That is, when the user powers up the user computer, steps 404–410 occur automatically. In alternative embodiments, the user may be required to start the communications portal and/or enter login information. Then the user selects and uses services provided by the continuous service provider in step 412. The user continues using the continuous service provider until finished in step 413. Then the user can turn the computer off or log out of the continuous service provider. If the user decides to log off of the continuous service provider, user computer 102b removes the IP address and static route entry 336 from routing table 332 in step 416. When the user powers down the user computer or logs off the continuous service provider, communications portal ends the session with the continuous service provider in step 411, and the process ends in step 414.

Figure 5:
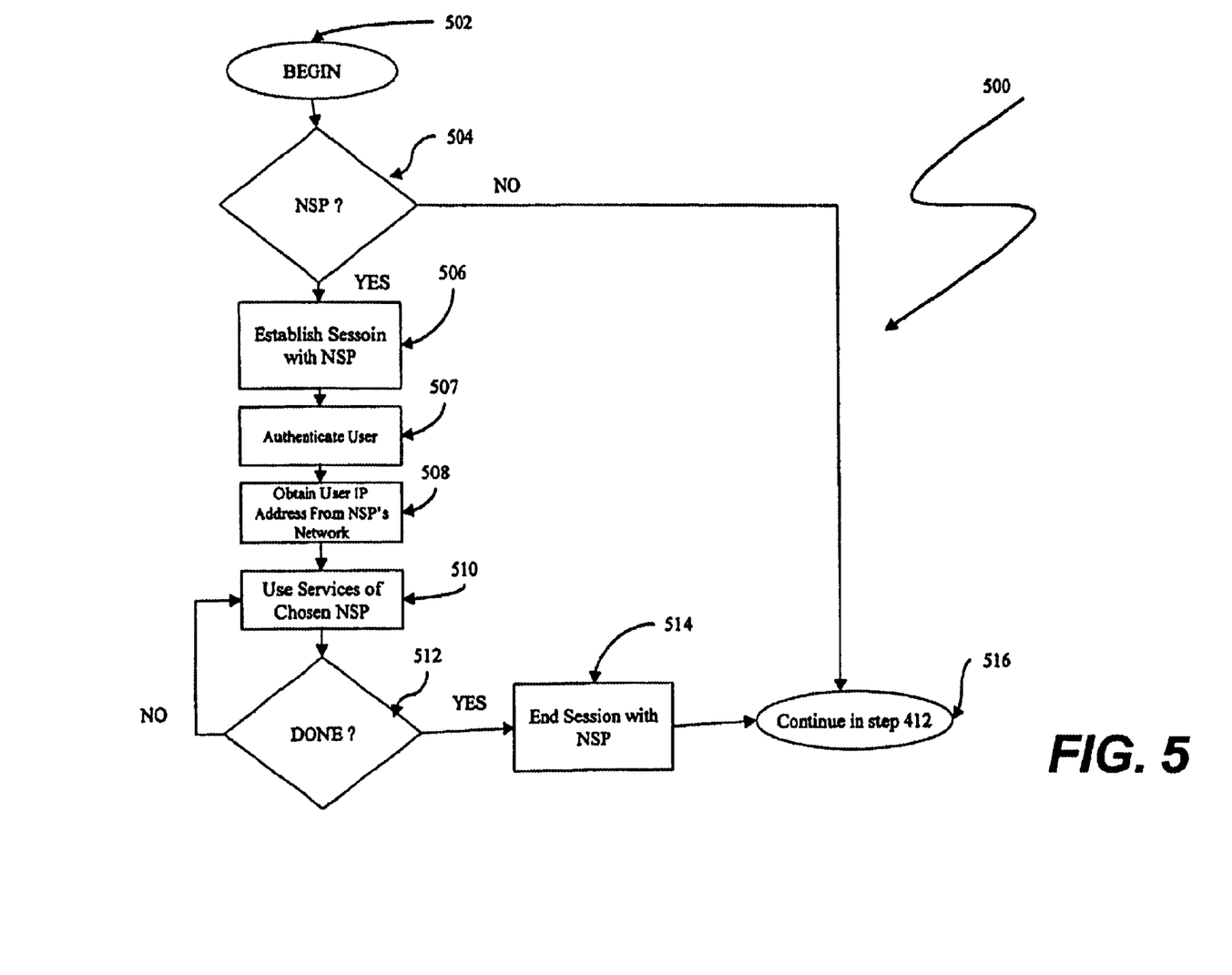
FIG. 5 is a flowchart for choosing services offered by an NSP according to a preferred embodiment of the present invention.

FIG. 5 is a flowchart 500 illustrating an expanded view of step 412 primarily with respect to choosing the services of another service provider. Referring to FIG. 5, the method begins in step 502 when a user chooses the services of the temporary service provider. Execution continues in step 504. In the preferred embodiment, the user can simultaneously choose the services of an NSP, separate and apart from the continuous service provider by clicking on that NSP's buttons/icon, which is displayed by the communications portal on the user's screen display. This choice is made in step 504.

If the user clicks on another NSP's icon, the communications portal establishes a PPP session with the chosen NSP in step 506. Once the PPP session is established, in step 507, the user is authenticated by the NSP, preferably using a proxy AAA system, such as service management system 305.

After logging in, the chosen NSP assigns an IP address to the user for communicating with the chosen NSP as shown in step 508. Using the IP address, the PC modifies the default gateway routing entry in the routing table. Steps 506–508 are preferably automatic in cases where the NSP's authentication is not very complicated, in the sense that the user has to enter little, if any,.information to complete them. In alternative embodiments, the user may be required to enter authorization and authentication information for the chosen NSP. Once the user is authorized, the user can use the services of the chosen NSP in step 510. The user continues to use the services until the user logs off the chosen NSP as shown in steps 510 and 512. When the user logs off the chosen NSP, thereby signifying that the user has finished using that NSP, the temporary logical connection established in step 506 is destroyed in step 514. This results in the PC clearing the temporary subnet field and temporary IP address field of dynamic entry 334 in the routing table 332. The use of the chosen NSP is completed in step 516 and the method continues in step 412 with further use of the continuous service provider's services.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for providing high speed data access services to a user using a computer, comprising:

a termination unit operatively coupled to the computer;

a continuous service provider comprising a server cluster having one or more servers for providing continuous services to the user;

a network service provider comprising at least one server for providing services;

a continuous logical connection established between said termination unit and said continuous service provider over a data network for the transmission of data between said computer and said continuous service provider;

a temporary logical connection established between said termination unit and said network service provider over the data network for the transmission of data between said computer and said network service provider; and wherein the computer further comprises a routing table containing a static route that identifies a communication path between the computer and said continuous service provider.

2. The system as recited in claim 1, further comprising:

a service gateway, wherein said continuous logical connection comprises:

a continuous logical connection between said termination unit and said continuous service provider using said service gateway; and wherein said temporary logical connection comprises:

a temporary logical connection between said termination unit and said network service provider using said service gateway.

3. The system as recited in claim 1, wherein a physical connection corresponding to said continuous logical connection comprises an ADSL link.

4. The system as recited in claim 1, wherein said network is an ATM network.

5. The system as recited in claim 1, wherein said server cluster comprises at least one of a directory server to create a list of users, including said user and a second user, who are simultaneously using said system, a voice mailbox server to allow the first user to perform voice mailbox functions, a community server to provide local information to the user, a facsimile server to perform facsimile processing functions, an email server to perform email services, a voice-over-IP server to allow the user to make a telephone call that can extend over the public switched telephone network, a unified message server and a proxy server.

6. The system as recited in claim 1, where said system is not directly connected to the Internet.

7. The system as recited in claim 1, in which there is a second user using a second computer, comprising:

a second termination unit coupled to the second computer; and a second continuous logical connection established between the second computer and said continuous service provider over said network for the transmission of data between said computer and said continuous service provider.

8. The system as recited in claim 1, further comprising:

a proxy server;

a second service provider providing services through an additional server; and a logical connection between said proxy server and said additional server through which additional services are provided to the user over said continuous logical connection.

9. The system as recited in claim 8, wherein said additional server is located outside a protective sphere of said continuos service provider.

10. A system for providing high speed data access services to a user using a computer, comprising:
   a termination unit operatively coupled to the computer;
   a continuous service provider comprising a server cluster having one or more servers for providing continuous services to the user;
   a network service provider comprising at least one server for providing services;
   a continuous logical connection established between said termination unit and said continuous service provider over a data network for the transmission of data between said computer and said continuous service provider;
   a temporary logical connection established between said termination unit and said network service provider over the data network for the transmission of data between said computer and said network service provider; and
   a second user using a second computer, comprising:
      a second termination unit coupled to the second computer; and
      a second continuous logical connection established between the second computer and said continuous service provider over said network for the transmission of data between said computer and said continuous service provider; and
   wherein said server cluster comprises a voice-over-IP server which allows the first user to place a telephone call to the second user over said network.

11. A system for providing high speed data access services to a user using a computer, comprising:
   a termination unit operatively coupled to the computer;
   a continuous service provider comprising a server cluster having one or more servers for providing continuous services to the user;
   a network service provider comprising at least one server for providing services;
   a continuous logical connection established between said termination unit and said continuous service provider over a data network for the transmission of data between said computer and said continuous service provider;
   a temporary logical connection established between said termination unit and said network service provider over the data network for the transmission of data between said computer and said network service provider; and
   one or more switched virtual circuits,
   wherein said continuous logical connection comprises:
      a continuous logical connection between said termination unit and said continuous service provider using said one or more switched virtual circuits; and
   wherein said temporary logical connection comprises:
      a temporary logical connection between said termination unit and said network service provider using said one or more switched virtual circuits.

12. A method for providing high speed data access services to a user using a computer, comprising the steps of:
   (a) establishing a continuous logical connection between the computer and a continuous service provider having a server cluster over a computer network;
   (b) establishing a temporary logical connection between the computer and a network service provider;
   (c) providing continuous services to the user over the continuous logical connection;
   (d) simultaneously providing temporary services to the user over the temporary logical connection;
   (e) authenticating the user for using the services provided by the continuous service provider;
   (f) supplying a first IP address to the user for obtaining services provided by the continuous service provider;
   (g) relaying authentication information between the user and the network service provider; and
   (h) supplying a second IP address to the user for obtaining services provided by the network service provider.

13. The method as recited in claim 3, wherein
   step (a) comprises the steps of:
      (i) establishing a first continuous logical connection between the computer and the continuous service provider; and
   step (b) comprises the steps of:
      (ii) establishing a first temporary logical connection between the computer and the network service provider.

14. The method as recited in claim 3, further comprising the steps of:
   (i) destroying the temporary logical connection established in step (b); and
   (j) establishing a second temporary logical connection between the computer and a second network service provider.

15. The method as recited in claim 3, wherein step (a) comprises the step of automatically establishing the continuous logical connection.

16. The method as recited in claim 3, further comprising the step of providing a graphical user interface to the user for aiding the user in choosing the services of both the continuous service provider and the network service provider.

17. The method as recited in claim 3, further comprising the step of communicating using ADSL format.

18. The method as recited in claim 3, further comprising the step of transmitting data using ATM.

19. The method as recited in claim 3, wherein step (c) comprises at least one of the steps of providing community services to the user, the step of providing voice mailbox services to the user, the step of providing directory services to the user, the step of providing facsimile services to the user, the step of providing email services to the user, the step of providing voice-over-IP services to the user, and the step of completing a telephone call using the public switched telephone network.

20. The method as recited in claim 19 wherein there is a second user using a second computer, further comprising the step of completing a telephone call from the first user to the second user over a computer network.

21. The system as recited in claim 12, further comprising the step of establishing said continuous logical connections through a service gateway.

22. The system as recited in claim 12, further comprising the step of establishing said continuous logical connections using one or more switched virtual circuits.

23. The system as recited in claim 12 further comprising the step providing access to the services of a second network service provider using a proxy server.

24. A method for providing high speed data access services to a user using a computer, comprising the steps of:
   (a) establishing a continuous logical connection between the computer and a continuous service provider having a server cluster over a computer network;

(b) establishing a temporary logical connection between the computer and a network service provider;

(c) providing continuous services to the user over the continuous logical connection;

(d) simultaneously providing temporary services to the user over the temporary logical connection; and (e) wherein step (a) comprises the steps of:
   (1) creating a static route identifying a communication path between the computer and the continuous service provider; and
   (2) storing said static route in a routing table in the computer.

25. A system for providing continuous and on-demand high speed data access services to a user, comprising:

a cluster of one or more servers that provide services to the user;

a continuous logical connection established between the user and said cluster of one or more servers that provide services to the user;

a temporary logical connection established between the user and a network service provider, wherein continuous services and temporary services are provided to the user simultaneously; and at least one switched virtual circuit through which said continuous and temporary logical connections are established.

26. The system recited in claim 25, further comprising a service gateway through which said continuous and temporary logical connections are established.

27. The system recited in claim 25, wherein said cluster of servers comprises at least one of a directory server to create a list of users, including said user and a second user, who are simultaneously using said system, a voice mailbox server to allow the first user to perform voice mailbox functions, a community server to provide local information to the user, a facsimile server to perform facsimile processing functions, an email server to perform email services, a voice-over-IP server to allow the user to make a telephone call over the public switched telephone network, a unified message server and a proxy server.

28. The system recited in claim 25 wherein said continuous logical connection is established at least in part over an ADSL link.

* * * * *